March 8, 1966 J. B. FLYNN 3,239,597

SELF-REPAIR CIRCUIT APPARATUS

Filed Sept. 16, 1963

INVENTOR.
JOHN B. FLYNN

BY Roger W. Jensen
ATTORNEY

United States Patent Office 3,239,597

Patented Mar. 8, 1966

3,239,597
SELF-REPAIR CIRCUIT APPARATUS

John B. Flynn, Belmont, Mass., assignor to Honeywell Inc., a corporation of Delaware Filed Sept. 16, 1963, Ser. No. 309,158
4 Claims. (Cl. 174—68.5)

This invention relates generally to self-repair circuitry and more specifically to an alloy which is usable in circuitry to obtain self repair of conductive elements by means of spontaneous metallic whisker growth from the conductive elements across broken areas or gaps in these conductive elements.

This invention is an improvement upon a copending United States application, Serial No. 300,816, filed August 8, 1963, in the name of William S. Jarnagin and assigned to the same assignee as the present invention. More specifically, while the invention in the above-mentioned William S. Jarnagin application recognized the fact that metallic whiskers could be used for spontaneous repair of circuit elements, the present invention provides a specific alloy which will accomplish this self repair. The alloy of the present invention contains approximately 60 percent by weight aluminum and from 1 to 5 percent by weight magnesium with the balance of the alloy being tin. This alloy will grow whiskers faster than any other alloy known at the present time and therefore will minimize the required self repair time.

It is therefore an object of this invention to provide a specific alloy which will grow metallic whiskers in broken areas of electrical apparatus for self repair of circuitry to maintain or reestablish electrical continuity.

Further objects and advantages of this invention will be realized from a reading of the specification along with the appended claims and drawings in which:

Figure 1:
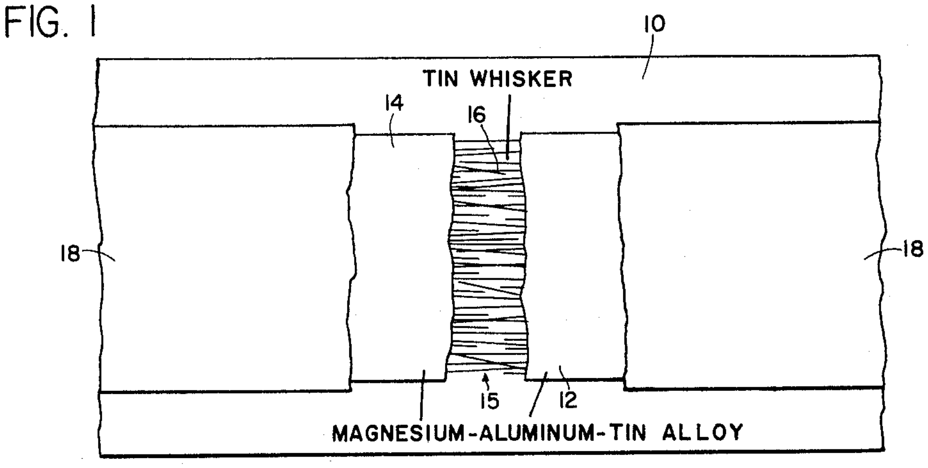
FIGURE 1 is a representation of a printed circuit conductor on a base substrate and is an enlarged view of a part of a circuit shown in FIGURE 3.

Whisker growth on various metal or metallic alloys has been observed for some time. Normally, however, the interest in whisker growth is how to prevent this whisker growth so as to eliminate the various difficulties resulting from such whisker growth. Examples of this problem are the prior art uses of certain alloys for printed circuits whereby the whiskers caused short circuits between adjacent conductors. However, the whisker growth was always at random and did not always appear when expected and many times appeared when unexpected. The present invention is specifically directed toward a conductive alloy which provides spontaneous whisker growth across breaks in the conductive circuitry to reestablish electrical contact between the opposite sides of the broken portion of a circuit conductive element. This circuitry can be altered or coated such that whisker growth is inhibited in undesirable locations such as outwardly from the sides of the conductor.

The rationale behind this embodiment of the invention lies upon the basis that stress will cause whiskers to grow on suitable metallic materials. Furthermore, the rate of whisker growth is proportional to the magnitude of the stress.

There are several theories on how these stresses are set up in the material so as to cause the whisker growth. The theory which appears to be most probable is that if two metal grains in a metallic specimen stay in contact and each have different temperature coefficients of expansion (at least for some crystallographic direction), strains or microstresses will result in the material as the alloy is cooled and the only way in which these stresses can be relieved is if one material or the other is compressed and/or extended from the alloy. Therefore, in order to maximize this stress on the grains of the metal and to obtain whisker growth spontaneously, it is desirable to obtain a mixture which maximizes the stress. A previous mixture which provided stress is aluminum and tin. Obviously, there are many other mixtures and alloys which will provide stress. In order to maximize the stress, either the hard portion (phase) of the mixture must be made harder and more unyielding and/or the soft portion (phase) may be made softer or altered in such a manner that whiskers will be forced out or generated more easily. It is also desirable to retain or increase the differential of coefficients of expansion with temperature (at least for some crystallographic direction) between the hard and soft portions (phases) of this mixture. For ease of discussion the hard portion (phase) such as aluminum has been termed a hard matrix while the soft portion (phase) such as the tin has been designated a soft fill. As is well known, a material is hard to find which is both unyielding and has a high temperature coefficient of expansion since these properties tend to run counter to each other in the elements. One solution to this problem is to use two or more metals or other substances to form the hard matrix. One such combination as aluminum and magnesium. Part of the present invention is the finding that more than two metals can be used to form the hard matrix. Additionally, the procedure may be reversed and a single metal may be used for the hard matrix while a more yieldable whisker growing combination of a plurality of metals or other conductive elements may be used for the soft fill. When a mixture is produced using the above mentioned elements of aluminum, magnesium, and tin, strains are introduced between the hard aluminum-magnesium matrix and the soft tin fill. These strains may produce metallic whiskers of substantially pure tin under some conditions and with the proper percentages of metal in the conductive alloy.

Referring now to the figures, FIGURE 1 illustrates a portion of a printed circuit board 10 which has attached thereto conductive alloy elements 12 and 14 which were originally one continuous unit but are shown as being broken, as at 15. In the break zone 15 between the portions of the conductive elements 12 and 14, small lines may be observed which are indicative of whiskers 16. It may be noted that some of the whiskers have not completely bridged the gap 15. One definition of the word "whiskers" is "a crystalline formation which is produced by stresses and/or by additions to a base". The embodiment being described is concerned primarily with the "stress" portion of the definition. Stresses in the constructive elements may be provided by mechanical or electrical or other means. On the circuit or conductive elements 12 and 14 a whisker inhibiting layer 18 is shown in a broken off form to disclose better the whiskers 16 and the conductors 12 and 14. The whisker inhibiting layer may be of some material such as lacquer which will stop the growth on the exterior surface of the conductive elements such as 12 and 14 so that whiskers will only grow in surfaces or faces of the element which are not covered with the inhibiting material due to recent breakage of the conductive element. The surfaces just described as being covered with lacquer may be termed "normally exposed surfaces." This term is not intended to include the surfaces introduced by breaks or gaps in the conductive element. It will be realized that in a normal break of the conductive element, the inhibiting layer 18 will break in approximately the same manner as the conductive element and whiskers will only grow across the break.

Figure 2:
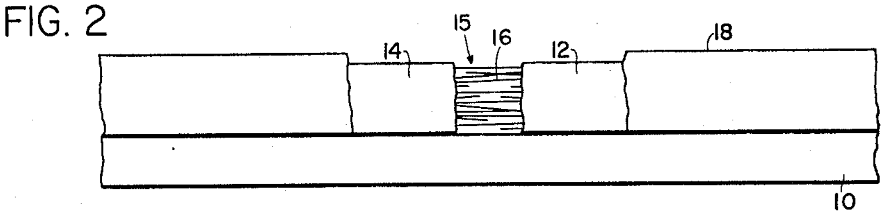
FIGURE 2 is a side view of the apparatus shown in FIGURE 1.

FIGURE 2 is a side view of the drawing of FIGURE 1 and has identical numbers used to designate corresponding portions of the article viewed in FIGURE 1.

Figure 3:
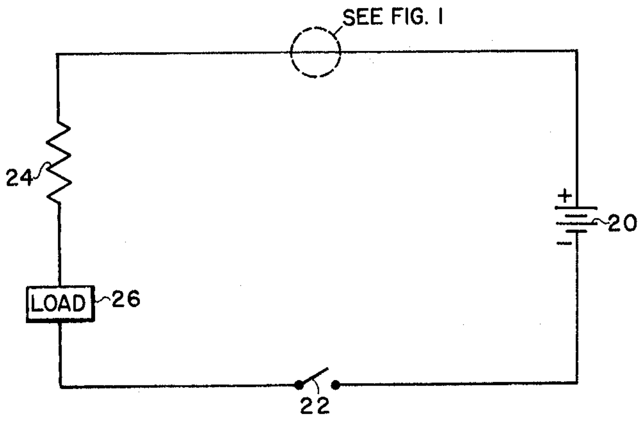
FIGURE 3 is an electrical schematic of a representative circuit in which self repair might be used.

FIGURE 3 is an electrical schematic of a circuit which may be used to illustrate the properties of self repair. The circuit with the notation "see FIG. 1" in FIGURE 3 is enlarged in FIGURE 1 to show the self repair of the break 15. A battery or voltage source 20 is connected at one end to a switch generally designated as 22 and at the other end to a resistor generally designated as 24. A load 26 is connected between the other end of resistor 24 and the other end of switch 22. Upon breakage of the conductive element at zone 14, as shown in FIGURE 1, the application of power to the load will be discontinued. If the resistance in series with the power source 20 is great enough so that the generated whiskers are not subject to great current loads upon first contact with the opposite side of the break, the power can be left in an ON condition. As a matter of fact, voltage across a broken junction seems to improve or decrease the repair time of the circuit. This was shown in an experiment where a 22½ volt battery was placed in series with a 22 megohm resistor and a broken conductor. A similar broken conductor but without the battery was also placed in the same environment. While whiskers bridged both breaks, they grew faster in the circuit using the battery. Within a few days the whiskers withstood several milliamp signals therethrough. As may be observed from the above, however, the circuit will repair itself even without voltage being applied across the broken portions of the conductive element. It may be necessary in circuits where a low resistance load is used to disrupt the circuit by a switching means such as 22 until the whiskers have created a substantial number of contacts across the broken gap to allow the current flow necessary across this gap without destruction.

Present experiments with this embodiment of the invention have indicated that good whisker growth can be obtained by using 59 parts by weight of aluminum, 1–4 parts by weight of magnesium and the remaining amount composed of tin. However, the whiskers have been successfully grown where the aluminum is considerably less than 59 percent and in places where the aluminum is somewhat greater than 59 percent. In some instances also the magnesium may be greater than 4 percent by weight or less than 1 percent by weight. It therefore will be realized by those skilled in the art that these materials and others can be used in varying percentages to produce whisker growth. In using these metals for an alloy, whiskers averaging about 0.02 centimeter long have been observed after about two months growth. In some cases whiskers approaching one millimeter have grown in a few days.

As mentioned previously it will be realized by those skilled in the art that this invention is not limited to the specific embodiment of 59 percent by weight aluminum and 1–4 percent by weight magnesium with the remainder tin. The invention comprises the use of a plurality of metals for a hard matrix combined with at least one soft fill metal for metallic whisker growth of a spontaneous nature varying over a wide range of percentages by weight of these metallic elements. While a substrate 10 has been shown as the holding and supporting means for the conductive alloy 14 it will be realized that other substances may be used. One example would be to cover the entire conductor with a fairly rigid rubber or plastic insulator which would inhibit whisker growth and also keep the alloy in a position where whisker growth repair is possible. I therefore wish to be limited only by the appended claims.

I claim:

1. Self repair electronic circuitry wherein growth of metallic whiskers is utilized for bridging gaps in conductive elements to reestablish electrical continuity comprising, in combination:

electrically insulating substrate means;

conductive element alloy means attached to said substrate means, the composition of said conductive element alloy means consisting essentially of about 59 percent by weight of aluminum, about 1 to 4 percent by weight of magnesium and the remainder tin, said conductive element alloy means generating metallic tin whiskers from exposed surfaces, and said conductive element alloy means having normally exposed surfaces when said conductive alloy means is in an electrically continuous unbroken condition; and covering means attached to the normally exposed surfaces of said conductive element alloy means for inhibiting growth of metallic whiskers on the normally exposed surfaces.

2. An alloy for use in self repair of electronic circuitry wherein metallic whiskers are utilized for bridging gaps in conductive elements to reestablish electrical continuity comprising, in combination:

conductive element alloy means, the composition of said conductive element alloy means consisting essentially of about 59 percent by weight of aluminum, about 1 to 4 percent by weight of magnesium and the remainder substantially tin, said conductive element alloy means generating metallic tin whiskers from exposed surfaces, and said conductive element alloy means having normally exposed surfaces when said conductive alloy means is in an electrically continuous unbroken condition; and covering means attached to the normally exposed surfaces of said conductive element alloy means for inhibiting growth of metallic whiskers on the normally exposed surfaces.

3. Self repair electronic circuitry wherein growth of metallic whiskers is utilized for bridging gaps in conductive elements to reestablish electrical continuity comprising, in combination:

electrically insulating substrate means;

conductive element means attached to said substrate means, the composition of said conductive element means comprising magnesium and tin, said conductive element means generating metallic tin whiskers from exposed surfaces, and said conductive element means having normally exposed surfaces when said conductive means is in an electrically continuous unbroken condition; and covering means attached to the normally exposed surfaces of said conductive element means when said conductive element means is unbroken for inhibiting growth of metallic whiskers on the normally exposed surfaces.

4. A new composition of electronic circuitry matter consisting essentially of:

from about 50 to about 65 percent by weight of aluminum;

from about 1 to about 5 percent by weight of magnesium; and the balance, together with incidental impurities, tin.

References Cited by the Examiner

UNITED STATES PATENTS

| | | | |
|---|---|---|---|
| 2,081,951 | 6/1937 | Paine et al. | 75—147 |
| 2,441,960 | 5/1948 | Eisler. | |

OTHER REFERENCES

"Constitution of Binary Alloys," published in Metals Handbook 1948 Edition, pp. 1066, 1163 and 1227.

Growth and Perfection of Crystals, John Wiley & Sons, Inc., New York, pp. 26–36.

ROBERT K. SCHAEFER, *Primary Examiner.*

DARRELL L. CLAY, *Examiner.*